United States Patent Office 2,697,077
Patented Dec. 14, 1954

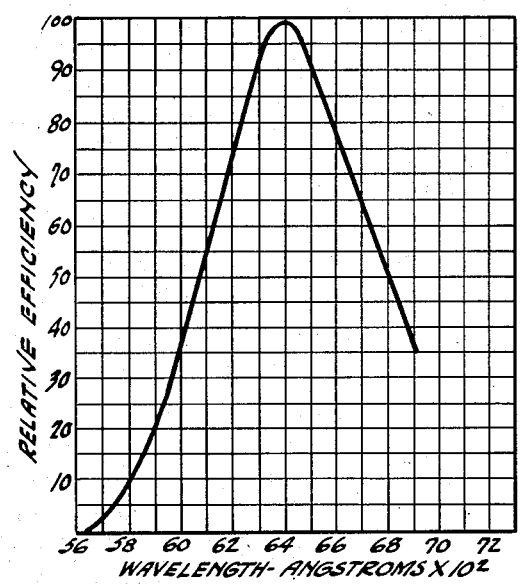

2,697,077

METHOD OF MAKING A ZINC PHOSPHATE PHOSPHOR

Arthur L. J. Smith and John A. Markoski, Lancaster, Pa., assignors to Radio Corporation of America, a corporation of Delaware Application December 26, 1950, Serial No. 202,734

6 Claims. (Cl. 252—301.6)

This invention relates to novel phosphor materials and more particularly to novel phosphor materials having their peak emission in the red portion of the spectrum.

Luminescent screens for kinescope tubes to be used in black and white television are usually made of a mixture of two different phosphors, one of which has its principal emission in the blue and the other of which has its principal emission in the yellow. The proper mixture of these produces an emission which, to the eye, appears white.

For "all electronic" color television, however, phosphors are needed which emit in the red, blue, and green regions. If a three-kinescope system is used, each of the three kinescope tube screens is coated with a different one of these phosphors. If a single kinescope tube is used, the screen of the tube may be covered with a large number of 3-dot clusters, for example. In each cluster, each of the three dots is composed of a phosphor emitting a different one of the three colors.

Phosphors capable of highly efficient emission in the blue and in the green regions of the spectrum are known. No problem is therefore presented, insofar as the green or the blue emitters is concerned, in the manufacture of suitable kinescope tubes for color television. On the other hand, there has been a serious problem in finding a phosphor having both a desirable shade of red emission color and sufficiently high emission efficiency to match the efficiencies of the blue emitting and the green emitting phosphors.

Previously, the best of the red emitting phosphors suitable for use in color television kinescopes has been manganese-activated cadmium borate. The emission efficiency of this phosphor is, however, far below that of the best of the sulfide phosphors emitting in the blue or the green regions.

One object of the present invention is to provide a novel red emitting phosphor.

Another object of the invention is to provide a red emitting phosphor of higher efficiency than that of most previously known red emitting phosphors.

Another object of the invention is to provide a novel red emitting phosphor having good stability under cathode ray excitation.

Another object of the invention is to provide a novel phosphor having red emission of the proper wavelength to be used with high efficiency green-emitting and blue-emitting phosphors in color television kinescopes.

Another object of the invention is to provide a novel red-emitting phosphor adapted to be processed in cathode ray tube screens.

These and other objects of the invention will be more apparent from the following description and the accompanying drawing which is a graph showing a typical emission curve of a phosphor prepared in accordance with the present invention.

In general, the novel material of the present invention is a phosphor which may be described as manganese-activated zinc orthophosphate having a peak emission in the neighborhood of 6380 Å. and having a particular crystalline form which may be identified through its X-ray diffraction pattern.

It has been found unexpectedly that manganese-activated zinc orthophosphate phosphor may exist in at least three distinct crystalline forms. These forms are prepared by different methods and each has its own distinctive emission characteristic. The present application deals with what may be termed the $\beta$ (beta) form and methods of preparing it. This form has its peak emission at about 6380 Å. Another of the three forms may be termed the $\alpha$ (alpha) form. This form has its peak emission at about 5500 Å., in the green wavelength portion of the spectrum. The preparation of this phosphor, and the phosphor, per se, are disclosed and claimed in a co-pending application of Arther L. J. Smith, Serial No. 202,736, filed December 26, 1950. The third form may be termed the $\gamma$ (gamma) form. It, too, has its peak emission in the red wavelength region of the spectrum at about 6380 Å. The gamma form is disclosed and claimed in another co-pending application of Arthur L. J. Smith, Serial No. 202,735, filed December 26, 1950.

An example of preparation of the phosphor material of the present invention will now be given.

EXAMPLE

A quantity of C. P. zinc orthophosphate is thoroughly mixed with 5 mol % of a manganese activator in the form of a manganese salt. The manganese salt may be an oxy-salt, such as the sulfate, or carbonate, for example. Preferably, the manganese activator and the zinc salt are co-precipitated from the same solution as orthophosphates. For example, $ZnSO_4$, $MnSO_4$ and $Na_2HPO_4 \cdot 7H_2O$ may be mixed together in proper proportion in aqueous solution, co-precipitating hydrated $Zn_3(PO_4)_2$ and $Mn_3(PO_4)_2$.

The co-precipitate is washed until it is substantially free of sodium ion, dried, and fired in air at about 800°–1060° C. The time of firing depends upon the firing temperature and the size of the batch. For example, if the firing temperature is 1000° C., firing may take place from about 15 minutes to 1 hour. At 800°–900° C., the firing time may be from about 15 minutes to 2 hours. Although the above firing temperature range is preferred for making a phosphor suitable for kinescope tube screens, firing temperature may be up to several hundred degrees higher than 1060° C., if a fused material is desired. The upper limit of firing temperature then is limited only by the decomposition temperature of the material. For a sample having a weight of a few grams, firing at about 900° C. for about 15 minutes is sufficient. When firing a sample of 1000 grams, firing conditions of 1000° C. and 30 minutes firing time are preferred. Longer firing times serve merely to sinter the material, which is undesirable for kinescope tube applications.

Within the range of firing temperatures specified above, the manganese activator may be present in an amount of 1–10 mol %.

The material, prepared as above described, has an emission curve, as shown in the figure, with peak emission at about 6380 Å. The relative efficiencies throughout the waveband of emission are also indicated on the graph. The peak emission is higher than that of manganese-activated cadmium borate, best previously used red-emitting phosphor.

The decay rate of the phosphor is dependent upon firing temperature. Thus, firing temperatures should not be substantially lower than the 900° C. specified if the phosphor is to be used in television kinescopes. If longer decay rate is desired, firing temperature may be as low as about 800° C.

In order to illustrate the differences in the crystal structures of the three different forms of the manganese-activated zinc orthophosphate phosphor, comparative X-ray diffraction data are given in the table below. The data were obtained by exposing films of the three phosphors in a General Electrix XRD unit with a copper target tube. The radiation was filtered with nickel to give $K_\alpha$ radiation.

Table
X-RAY DIFFRACTION DATA

| $Zn_3(PO_4)_2$:Mn Alpha form | | $Zn_3(PO_4)_2$:Mn Beta form | | $Zn_3(PO_4)_2$:Mn Gamma form | |
|---|---|---|---|---|---|
| $d$Å° | Relative intensity | $d$Å° | Relative intensity | $d$Å° | Relative intensity |
| 4.6 | .40 | 4.2 | .30 | 8.5 | .05 |
| 4.4 | .40 | 3.9 | .80 | 5.6 | .05 |
| 4.2 | .20 | 3.65 | .30 | 4.35 | 1.00 |
| 4.0 | .70 | 3.5 | .15 | 4.0 | .45 |
| 3.60 | .90 | 3.3 | 1.00 | 3.8 | .05 |
| 3.42 | .45 | 3.1 | 1.00 | 3.4 | 1.00 |
| 3.25 | .15 | 2.85 | 1.00 | 3.22 | .30 |
| 3.10 | 1.00 | 2.64 | .05 | 3.02 | .30 |
| 2.80 | .20 | 2.55 | .45 | 2.90 | .10 |
| 2.63 | .40 | 2.48 | .45 | 2.80 | .30 |
| 2.52 | .30 | 2.38 | .50 | 2.70 | .10 |
| 2.43 | .50 | 2.30 | .30 | 2.62 | .10 |
| 2.29 | .40 | 2.19 | .30 | 2.50 | .80 |
| 2.23 | .30 | 2.14 | .30 | 2.43 | .45 |
| 2.10 | .30 | 2.08 | .65 | 2.38 | .45 |
| 2.02 | .20 | 2.02 | .25 | 2.30 | .10 |
| 1.96 | .25 | 1.99 | .25 | 2.22 | .15 |
| 1.83 | .35 | 1.95 | .25 | 2.10 | .65 |
| 1.77 | .30 | 1.90 | .30 | 2.02 | .40 |
| 1.66 | .40 | 1.86 | .65 | 1.93 | .10 |
| 1.59 | .10 | 1.77 | .30 | 1.84 | .10 |
| 1.54 | .50 | 1.70 | .50 | 1.83 | .20 |
| 1.51 | .30 | 1.67 | .50 | 1.80 | .10 |
| 1.47 | .10 | 1.64 | .50 | 1.76 | .40 |
| 1.44 | .30 | 1.59 | .35 | 1.69 | .15 |
| 1.41 | .30 | 1.56 | .40 | 1.65 | .55 |
| 1.35 | .30 | 1.53 | .35 | 1.62 | .05 |
| 1.32 | .30 | 1.50 | .40 | 1.59 | .05 |
| 1.22 | .20 | 1.48 | .05 | 1.54 | .60 |
| 1.20 | .15 | 1.46 | .05 | 1.50 | .25 |
| 1.18 | .05 | 1.44 | .10 | 1.464 | .10 |
| 1.166 | .15 | 1.42 | .10 | 1.442 | .45 |
| 1.142 | .10 | 1.41 | .10 | 1.396 | .10 |
| 1.120 | .10 | 1.39 | .30 | 1.380 | .10 |
| 1.107 | .05 | 1.36 | .30 | 1.360 | .10 |
| 1.090 | .15 | 1.345 | .25 | 1.320 | .35 |
| 1.068 | .20 | 1.33 | .35 | 1.300 | .10 |

The above data show that there are three different crystalline forms of zinc orthophosphate phosphor and that these may be identified by the X-ray diffraction method. Those skilled in the art of interpreting X-ray diffraction data will recognize that slight changes in composition of the materials, as, for example, changes in the content of the manganese activator, will cause slight changes in both position and intensity of the $d$Å. lines. The novel phosphor of the present invention should, therefore, be construed as exhibiting $d$Å. lines substantially identical with those shown in the middle columns of the table. The particular sample of the phosphor of the present invention for which the X-ray diffraction data are given in the above table is one having a manganese activator content of 5 mol %. Since positive identification can usually be made by comparing only 10 or 15 of the strongest lines, all of the data given in the table are not necessary for identification purposes and are included as a matter of interest, only.

We claim as our invention:

1. A method of making a phosphor material having its principal emission in the red portion of the spectrum comprising firing zinc orthophosphate with 1 to 10 mol % of manganese as an inorganic salt thereof at a temperature of at least 800° C. and below the decomposition temperature of the material.

2. A method according to claim 1 in which said firing takes place for a period of 15 minutes to 2 hours.

3. A method according to claim 1 in which said firing takes place for from 15 minutes to 1 hour at 1000° C.

4. A method of making a phosphor material having its principal emission in the red portion of the spectrum comprising co-precipitating from 1 to 10 mol % of manganese as the orthophosphate with zinc orthophosphate and firing the precipitated mixture at 800°–1060° C.

5. A method of making a phosphor material suitable for color television kinescope tubes and having its principal emission in the red portion of the spectrum, comprising firing zinc orthophosphate with 1 to 10 mol percent of manganese as an inorganic salt thereof at a temperature of at least 900° C. and below the decomposition temperature of the material.

6. A method according to claim 5 in which the amount of said manganese is about 5 mol percent.

References Cited in the file of this patent
FOREIGN PATENTS

| Number | Country | Date |
|---|---|---|
| 469,731 | Great Britain | July 27, 1937 |

OTHER REFERENCES

Article by Henderson, Proceedings of the Royal Society of London, Series A, 173, page 332, 1939.